United States Patent
Ledvora et al.

(10) Patent No.: US 11,255,450 B2
(45) Date of Patent: Feb. 22, 2022

(54) MULTI-PORT MULTI-PLANE VALVE

(71) Applicants: Joseph Ledvora, Wheaton, IL (US); Thomas J. Davern, St. Charles, IL (US); James E. Pearson, Downers Grove, IL (US)

(72) Inventors: Joseph Ledvora, Wheaton, IL (US); Thomas J. Davern, St. Charles, IL (US); James E. Pearson, Downers Grove, IL (US)

(73) Assignee: Robertshaw Controls Company, Itasca, IL (US)

( * ) Notice: Subject to any disclaimer, the term of this patent is extended or adjusted under 35 U.S.C. 154(b) by 0 days.

(21) Appl. No.: 16/719,629

(22) Filed: Dec. 18, 2019

(65) Prior Publication Data
US 2020/0200284 A1   Jun. 25, 2020

Related U.S. Application Data

(60) Provisional application No. 62/782,155, filed on Dec. 19, 2018.

(51) Int. Cl.
*F16K 11/085*  (2006.01)
*F16K 5/04*    (2006.01)

(52) U.S. Cl.
CPC ........ *F16K 11/0856* (2013.01); *F16K 5/0471* (2013.01)

(58) Field of Classification Search
CPC ............... F16K 11/0856; F16K 5/0471; Y10T 137/86654
See application file for complete search history.

(56) References Cited

U.S. PATENT DOCUMENTS

| 1,422,178 A | 7/1922 | Cooley |
| 3,251,408 A | 5/1966 | Watson et al. |

(Continued)

FOREIGN PATENT DOCUMENTS

| CN | 103857436 A | 6/2014 |
| EP | 2713083 | 4/2014 |

(Continued)

OTHER PUBLICATIONS

Forbes, Tesla Goes Open Source: Elon Musk Releases Patents to "Good Faith" Use, Jun. 12, 2014, 3 pages; https://www.forbes.com/sites/briansolomon/2014/06/12/tesla-goes-open-source-elon-musk-releases-patents-to-good-faith-use/#113922913c63.

(Continued)

*Primary Examiner* — Kevin R Barss
(74) *Attorney, Agent, or Firm* — Reinhart Boerner Van Deuren P.C.

(57) ABSTRACT

Embodiments of a multi-port multi-plane valve are provided. The multi-port multi-plane valve includes a housing which defines an internal cavity. The housing further includes a plurality of ports in which each port lies within one of two planes that are normal to each other. Each of the plurality of ports is in communication with the internal cavity. A shell body is rotatably disposed within the internal cavity and provides selectable fluid communications between the ports. A seal member is also provided which has a plurality of openings and surrounds the shell body. At least one flow enhancer channel may be included to reduce the pressure drop occurring on one side of the valve when controlling flow paths on the other side of the valve.

13 Claims, 10 Drawing Sheets

(56) References Cited

U.S. PATENT DOCUMENTS

| | | | |
|---|---|---|---|
| 3,692,041 A | 9/1972 | Bondi | |
| 3,927,693 A | 12/1975 | Johnston | |
| 4,021,190 A | 5/1977 | Dickson | |
| 4,429,717 A | 2/1984 | Montgomery | |
| 4,655,252 A | 4/1987 | Krumhansl | |
| 4,909,933 A | 3/1990 | Carter et al. | |
| 4,968,334 A | 11/1990 | Hilton | |
| 5,084,031 A | 1/1992 | Todd et al. | |
| 5,431,189 A | 7/1995 | Jones | |
| 5,529,758 A | 6/1996 | Houston | |
| 5,871,032 A | 2/1999 | Ko | |
| 5,931,196 A | 8/1999 | Bernardi et al. | |
| 6,245,233 B1 | 6/2001 | Lu | |
| 6,308,739 B1 | 10/2001 | Barbuto et al. | |
| 6,539,899 B1* | 4/2003 | Piccirilli | F01P 7/167 123/41.08 |
| 6,688,333 B2* | 2/2004 | McLane | B60H 1/00485 123/41.1 |
| 7,506,664 B2 | 3/2009 | Norris et al. | |
| 7,837,771 B2 | 11/2010 | Barone | |
| 8,336,319 B2 | 12/2012 | Johnston et al. | |
| 8,347,831 B2* | 1/2013 | Vacca | F16K 11/085 123/41.08 |
| 8,402,776 B2 | 3/2013 | Johnston et al. | |
| 8,557,415 B2 | 10/2013 | Herron et al. | |
| 8,557,416 B2 | 10/2013 | Mardall et al. | |
| 9,212,751 B2 | 12/2015 | McLane et al. | |
| 9,527,403 B2 | 12/2016 | Mardall et al. | |
| 9,618,128 B2 | 4/2017 | Dourdeville et al. | |
| 9,687,769 B2 | 6/2017 | Mardall et al. | |
| 9,701,210 B2 | 7/2017 | Woo et al. | |
| 9,865,852 B2 | 1/2018 | Haer et al. | |
| 2003/0125673 A1 | 7/2003 | Houde et al. | |
| 2004/0221901 A1 | 11/2004 | Chen | |
| 2005/0006150 A1 | 1/2005 | Sims et al. | |
| 2006/0118066 A1 | 6/2006 | Martins | |
| 2006/0237359 A1 | 10/2006 | Lin et al. | |
| 2008/0223464 A1 | 9/2008 | Merrell | |
| 2010/0319796 A1 | 12/2010 | Whitaker | |
| 2011/0296855 A1 | 12/2011 | Johnston et al. | |
| 2012/0183815 A1 | 7/2012 | Johnston et al. | |
| 2012/0231306 A1 | 9/2012 | Herron et al. | |
| 2012/0237803 A1 | 9/2012 | Mardall et al. | |
| 2013/0193363 A1 | 8/2013 | Van Den Eijkel et al. | |
| 2013/0263949 A1 | 10/2013 | Bartnick et al. | |
| 2014/0053931 A1 | 2/2014 | Whitaker | |
| 2014/0090414 A1 | 4/2014 | McLane et al. | |
| 2014/0193683 A1 | 7/2014 | Mardall et al. | |
| 2015/0217654 A1 | 8/2015 | Woo et al. | |
| 2015/0306974 A1 | 10/2015 | Mardall et al. | |
| 2015/0354716 A1 | 12/2015 | Morein | |
| 2016/0200206 A1 | 7/2016 | Woo et al. | |
| 2016/0380248 A1 | 12/2016 | Haer et al. | |
| 2017/0056806 A1 | 3/2017 | Mardall et al. | |
| 2017/0096073 A1 | 4/2017 | Mardall et al. | |
| 2017/0152957 A1 | 6/2017 | Roche et al. | |
| 2017/0214008 A9 | 7/2017 | Mardall et al. | |
| 2017/0253107 A1 | 9/2017 | Castiglioni et al. | |
| 2017/0259200 A1 | 9/2017 | Mardall et al. | |
| 2018/0292016 A1 | 10/2018 | Ledvora et al. | |

FOREIGN PATENT DOCUMENTS

| | | |
|---|---|---|
| EP | 2921750 | 9/2015 |
| FR | 2940396 A1 | 6/2010 |
| GB | 270997 | 5/1927 |
| JP | 48-000824 | 1/1973 |
| JP | 59-090665 | 6/1984 |
| JP | 2006-118664 | 5/2006 |
| JP | 2015034560 | 2/2015 |
| JP | 2018-100682 | 6/2018 |
| KR | 10-0412805 B1 | 12/2003 |

OTHER PUBLICATIONS

Randall et al., Bloomberg Businessweek, Hell for Elon Musk is a Midsize Sedan, Jul. 12, 2018, 15 pages, https://www.bloomberg.com/news/features/2018-07-12/how-tesla-s-model-3-became-elon-musk-s-version-of-hell.

Tesla Motors Club, Tesla Thermal Management System—explanation, Mar. 25, 2017, 11 pages, https://teslamotorsclub.com/tmc/threads/tesla-thermal-management-system-explanation.88055/.

U.S. Appl. No. 16/719,629, Ledvora et al., filed Dec. 18, 2019.

* cited by examiner

MULTI-PORT MULTI-PLANE VALVE

CROSS-REFERENCE TO RELATED PATENT APPLICATION

This patent application claims the benefit of U.S. Provisional Patent Application No. 62/782,155, filed Dec. 19, 2018, the entire teachings and disclosure of which are incorporated herein by reference thereto.

FIELD OF THE INVENTION

This invention generally relates to multi-port valves, and more particularly to multi-port valves having multiple inlet and outlet ports to control flow in different planes.

BACKGROUND OF THE INVENTION

Multi-port valves are used in a variety of industries and applications. Such valves include one or more inlet ports and one or more outlet ports. A valve member disposed within a housing of the valve is responsible for governing the flow between the various ports. A portion of the valve member, e.g. a valve stem, protrudes from the housing and is acted upon by an actuator attached to the multi-port valve. As result, the actuator governs the position of the valve member within the housing, which in turn governs the flow between the various ports.

Such multi-port valves advantageously provide a single flow device which can effectively replace multiple flow devices which only employ a single inlet and a single outlet. However, such multi-port valves are not without their own drawbacks. For example, the overall complexity of the valve increases as the number of ports increases. This can lead to relatively high part count assemblies. Further, this complexity in construction also results in a more complex manufacturing process for making the valve. Indeed, the multiple ports are associated with multiple inlets and outlets of the valve which must be welded onto a housing. Further the desired fitting for each inlet and outlet must also be welded on to its respective inlet or outlet.

Such welded up assemblies increase the number of potential leak paths of the valve. Further, to achieve such welds, special machining steps are often needed at the inlets and outlets as well as the housing to ensure there is a tight fit between these components for subsequent welding.

Furthermore, a number of individual seals are required to effectively seal the various ports of the multi-port valve off from one another. These multiple seals also lead to an increase in overall cost and complexity of the multi-port valve.

Multi-port valves that overcome these issues are available from the assignee of the instant application, and are described in U.S. Pat. No. 9,212,751 ("Valve system and method" by Allan R. McLane et al.), issued Dec. 15, 2015, and co-pending U.S. patent application Ser. No. 15/945,173 (Publication No. 2018/0292016, "Multi-port valve" by Joe Ledvora et al.), filed Apr. 4, 2018, and claiming priority to U.S. Provisional Application No. 62/483,167, filed Apr. 7, 2017, the teachings and disclosure of which are hereby incorporated in their entireties by reference thereto.

In many applications that utilize such multi-port valves, fluid flow in multiple planes is required and typically provided via the external plumbing in the fluid control system. Unfortunately, the use of such external plumbing greatly increases the required volume or footprint of the overall fluid control system, and can create problems necessitating re-routing and re-locating of other components in its or other systems that need to occupy that volume.

Accordingly, there is a need in the art for a multi-port valve that provides multi-planar fluid flow and control within the volume of the valve itself. Embodiments of the present invention provide such a multi-port multi-plane valve. These and other advantages of the invention, as well as additional inventive features, will be apparent from the description of the invention provided herein.

BRIEF SUMMARY OF THE INVENTION

In one aspect, embodiments of the present invention provide a multi-port multi-plane valve having a reduced part count and a reduced cost relative to prior designs, and that provides multi-planar fluid flow and control. An embodiment of such a multi-port multi-plane valve includes a housing. The housing defines an internal cavity. The housing further includes a plurality of ports, at least one of which lies in a different plane from the other(s). Preferably, at least one of the ports lies in a plan normal to the plane of the other ports. Each of the plurality of ports is in communication with the internal cavity.

A preferred embodiment also includes a shell body rotatably disposed within the internal cavity. This shell body is configured to provide flow between different ports existing in the same plane and between different ports existing in different planes based on its angular position within the valve housing.

A seal member is also provided which has a plurality of openings and surrounds the shell body such that it circumscribes the shell body within the internal cavity. In certain embodiments, each opening of the plurality of openings of the seal member is associated with one of the plurality of ports lying in one plane such that each of the plurality of ports in that plane are sealed from one another along the outer periphery of the seal member.

In certain embodiments, the seal member seals outwardly in a radial direction against an interior surface of the housing. In other embodiments, the seal member includes a plurality of seal ribs which seal against the shell body. The seal member may be one of a continuous piece of elastomeric material, or comprises a rigid core with a plurality of elastomeric seals attached thereto.

In certain embodiments, the valve also includes a plurality of port bodies, respectively received in the plurality of ports such that one port body of the plurality of port bodies is received in one port of the plurality of ports. In certain embodiments, the seal member comprises a plurality of seal segments.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the figures, as will be understood from the following, embodiments of a multi-port multi-plane valve assembly and its associated multi-port multi-plane valve are described herein. The multi-port multi-plane valve advantageously overcomes existing problems in the art by presenting an overall construction with a reduced part count, a reduced number of potential leak paths, a reduction in overall assembly time and cost, and reduced external plumbing to provide fluid flow and control in multiple planes.

As discussed in the above identified co-pending U.S. patent application Ser. No. 15/945,173 (Publication No. 2018/0292016, "Multi-port valve" by Joe Ledvora et al.), filed Apr. 4, 2018, the teachings and disclosure of which is hereby incorporated in its entirety by reference thereto, multi-port valve assemblies typically, as here, include an actuator (not shown herein) mounted to the multi-port valve. The actuator is responsible for actuating a valve member (i.e., a shell body as described below) which in turn governs the flow characteristics through the valve. The actuator may be any style of actuator typically used in valve actuation, e.g., rotary, linear, etc., and may rely on any type of power source typically used in valve actuation, e.g., electric, hydraulic, and pneumatic, etc. Monitoring of the rotational position of the valving member may also utilize any type of position sensing, e.g., via a Hall-effect sensor, potentiometer, stepper motor control, etc. As such, the actuator and position sensing are non-limiting on the invention herein.

Figure 1:
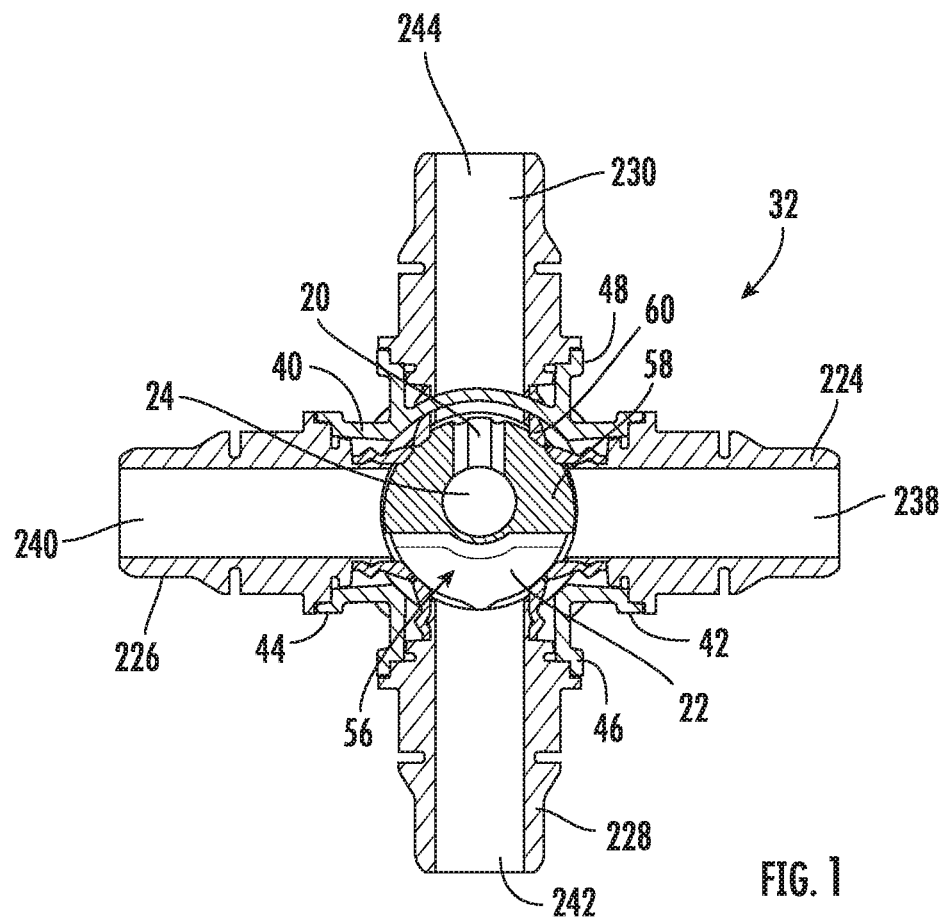
FIG. 1 is top a cross-sectional illustration of an embodiment of a multi-port multi-axis valve constructed in accordance with the teaching of the present invention having four ports in a first plane of the illustration and a fifth port in a second plane perpendicular to the first plane, with its shell body positioned at a 0° location.

Turning now to FIG. 1, an embodiment of the multi-port multi-plane valve 32. Valve 32 includes a housing 40. In one advantageous implementation of the invention, housing 40 is formed as a single piece. By "formed as a single piece" it is meant that the main body of housing 40 and its associated ports are not an assembly of separate components which are subsequently joined together by a joining process, e.g., welding, as is done in conventional valve housings. Rather, housing 40 is formed as a single unitary piece by any process capable of achieving such a configuration, e.g. injection molding, 3D printing, etc. However, it is contemplated by the teachings herein that housing 40 may be embodied as an assembly of separate components which are subsequently joined together by a joining process.

As illustrated, housing 40 includes a plurality of ports, in particular, a first port 42, a second port 44, a third port 46, a fourth port 48, and a fifth port 50 (see FIG. 7) that lies in a plane or along an axis that is normal to the plane of the other four ports 42, 44, 46, 48 in the illustrated embodiment. Of course those skilled in the art will recognize that other angles may be provided. Each of the ports 42, 44, 46, 48, 50 are in fluid communication with an internal cavity 56 of housing 40. Further, each of ports 42, 44, 46, 48, 50 may function as an inlet or an outlet, or both, of valve 32.

Still referring to FIG. 1, internal cavity 56 receives a generally cylindrical shell body 58 which operates as a valve member for controlling the flows between the plurality of ports 42, 44, 46, 48, 50. A seal member 60 is also received in cavity 56 and surrounds the outer periphery of shell body 58. This seal member 58 is a continuous cylindrical element, except for the openings formed therein. As will be discussed below, seal member 60 is a single piece seal which advantageously creates a seal for each of the plurality of ports 42, 44, 46, 48 to prevent unintended cross flow or short circuiting.

Seal member 60 also advantageously entirely seals internal cavity 56, such that no additional seals need be associated with port 50 or a cover 62 (see FIG. 7) of valve 32. It is possible, however, that seal member 60 may also be formed as separate seal segments which immediately next to one another in the circumferential direction, which together define a seal member which surrounds the shell body 58. The term "seal member" as used herein includes both configurations, i.e. a single unitary seal member, or a seal member formed of a plurality seal segments.

Shell body 58 includes a plurality of openings. The openings of seal member 60 remain statically aligned with ports 42, 44, 46, 48, 50 so that each opening is associated with one port, and seals against an interior surface of housing 40 that defines cavity 56, around the opening of the port into cavity 56. Opening 20 and 22 in shell body 58, however, are selectively alignable with ports 42, 44, 46, 48, and opening 24 is aligned with port 50 to govern the flows between the ports. The shell body 58 includes a valve stem 64 (see FIG. 7) which extends through an opening in housing 40. This valve stem, and in turn the remainder of shell body 58, is rotatable about axis by an actuator as discussed above.

Figure 7:
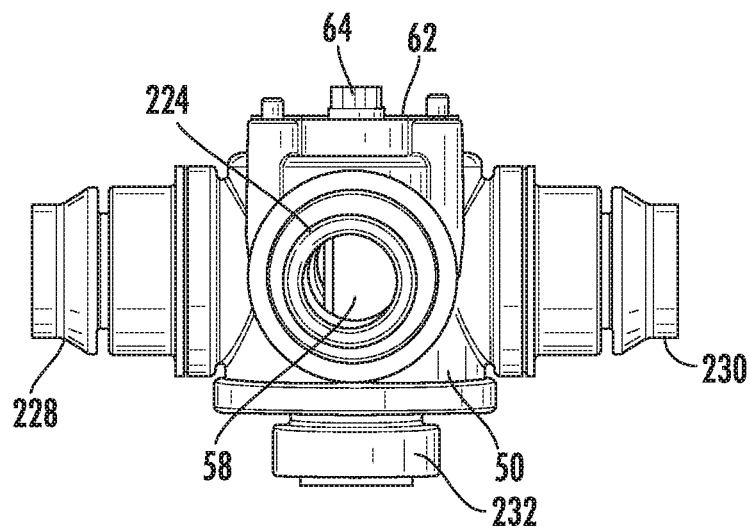
FIG. 7 is a right-side perspective view illustration of the embodiment of the multi-port multi-axis valve of FIG. 1 positioned to show the fifth port not visible in FIG. 1.

A plurality of port bodies, namely, a first port body 224, a second port body 226, a third port body 228, a fourth port body 230, and a fifth port body 232 (see FIG. 7) are respectively received in the first through fifth ports 42, 44, 46, 48, 50 as illustrated. The port bodies 224, 226, 228, 230 are substantially identical to one another, but port body 232 differs in the illustrated embodiment. Port body 224, 226, 228, 230 includes a through bore 238, 240, 242, 244 which communicates with an internal cavity 56 containing shell body 58 rotatably disposed therein through port 42, 44, 46, 48, respectively, of housing 40. Port body 232 provides passage through port 50 of housing 40 as shown in FIG. 7.

Having now described the structure of an embodiment of the present invention, attention will now be directed to the orientation of the shell body 58 in each of FIGS. 1-6 to discuss the fluid control provided by rotation thereof.

As shown in FIG. 1, the shell body 58 is located in a first position referred to herein as 0°. In such position the openings 20 and 24 provide fluid communication between ports 48 and 50 (see FIG. 7) and provide a change in the axis of flow between the two different planes in which the ports 48 and 50 lie. In this position the opening 22 provides fluid communication between ports 42, 44, and 46. This communication is equal between ports 42 and 44, and may provide a 50%-50% mix of fluid flow from ports 42, 44 into port 46, or vice versa, in certain implementations. Indeed, the percentage mix or flow can be varied between the ports 42, 44 by rotating the shell body 58 to provide a greater or lesser communication with opening 22.

Figure 2:
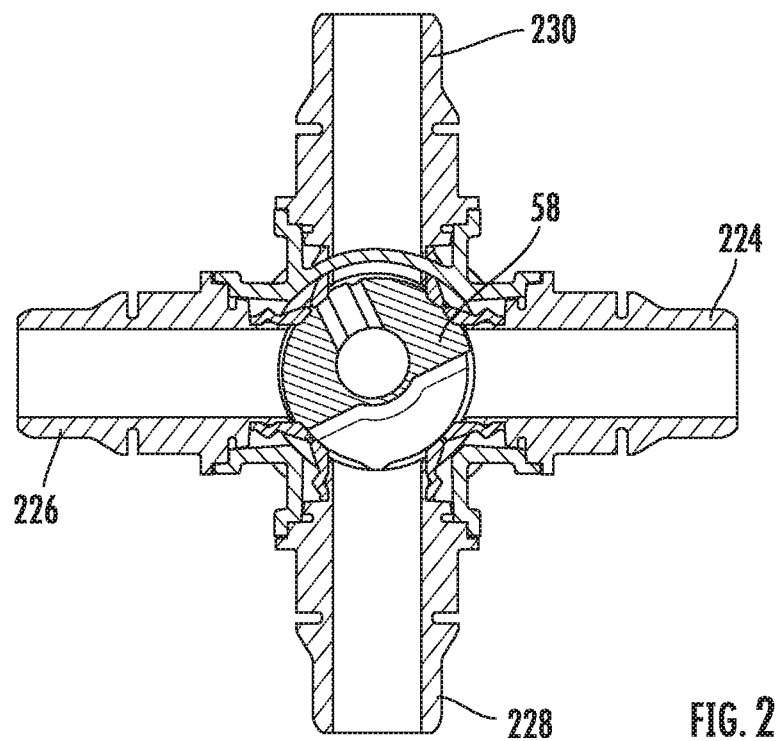
FIG. 2 is a cross-sectional illustration of the embodiment of the multi-port multi-axis valve of FIG. 1 with its shell body positioned at a 24° counter-clockwise location relative to the shell body position shown in FIG. 1.
Figure 3:
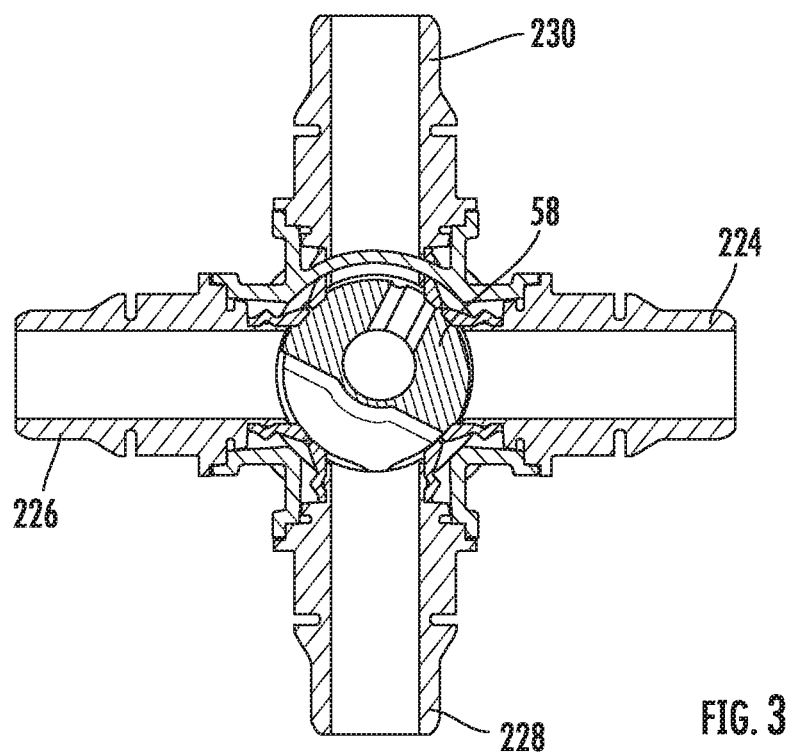
FIG. 3 is a cross-sectional illustration of the embodiment of the multi-port multi-axis valve of FIG. 1 with its shell body positioned at a 24° clockwise location relative to the shell body position shown in FIG. 1.

Once the shell body 58 has rotated about 24° in the illustrated embodiment as shown in FIG. 2, port 44 is isolated such that it has no fluid communication to any of the other ports. However, fluid communication is still provided between ports 42 and 46 (and between 48 and 50). A rotation of the shell body 58 about 24° from the orientation of FIG. 1 in the other direction as shown in FIG. 3 isolates port 42 such that it has no fluid communication to any of the other ports. However, fluid communication is still provided between ports 44 and 46 (and between 48 and 50). As the angle of rotation is varied, the area of the openings 20 and 22 that is exposed to the particular port also varies once an edge of the opening moves past the seal 60 edge.

Figure 4:
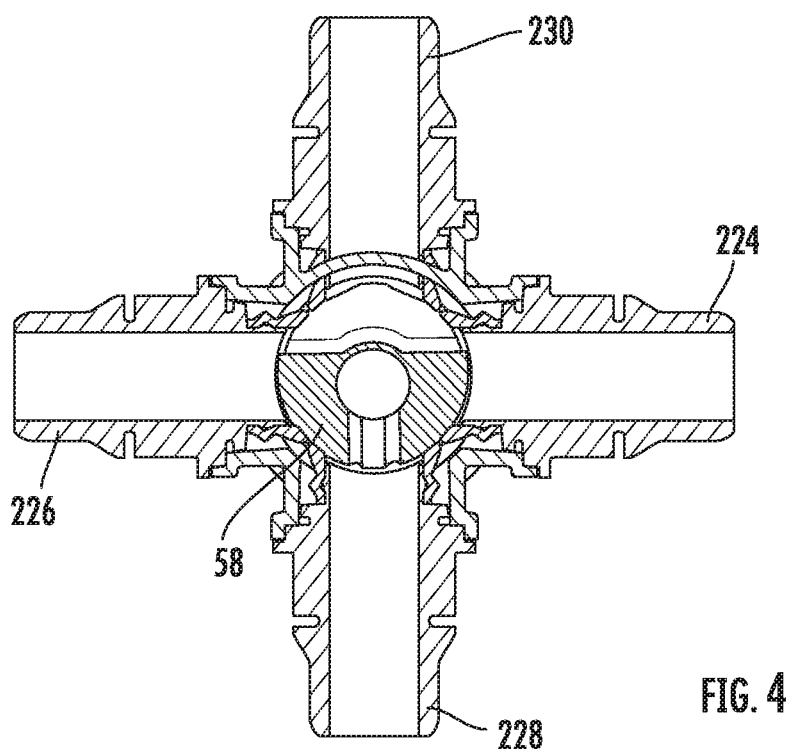
FIG. 4 is a cross-sectional illustration of the embodiment of the multi-port multi-axis valve of FIG. 1 with its shell body positioned at a 180° location relative to the shell body position shown in FIG. 1.
Figure 5:
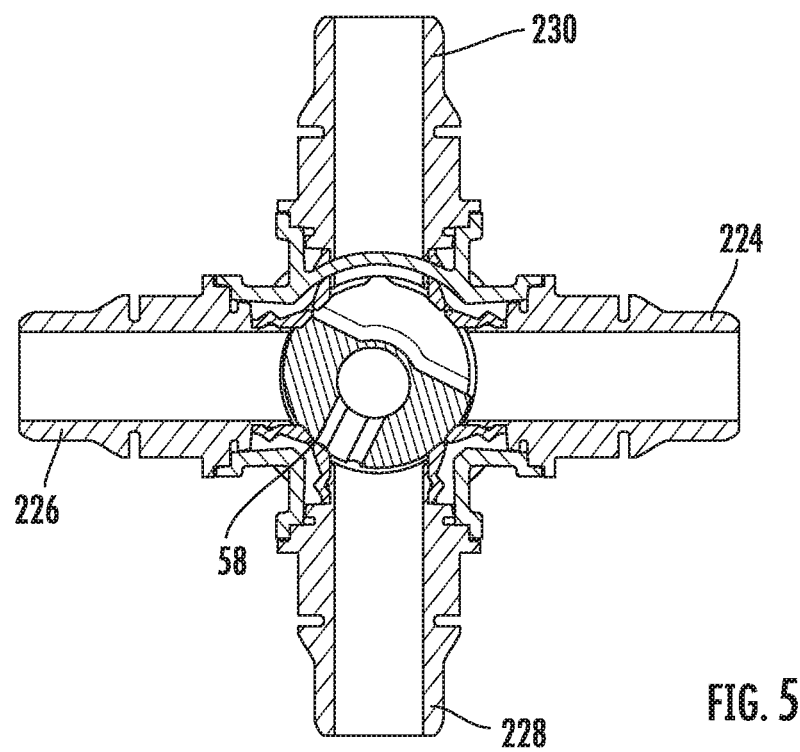
FIG. 5 is a cross-sectional illustration of the embodiment of the multi-port multi-axis valve of FIG. 1 with its shell body positioned at a 156° counter-clockwise location relative to the shell body position shown in FIG. 1.
Figure 6:
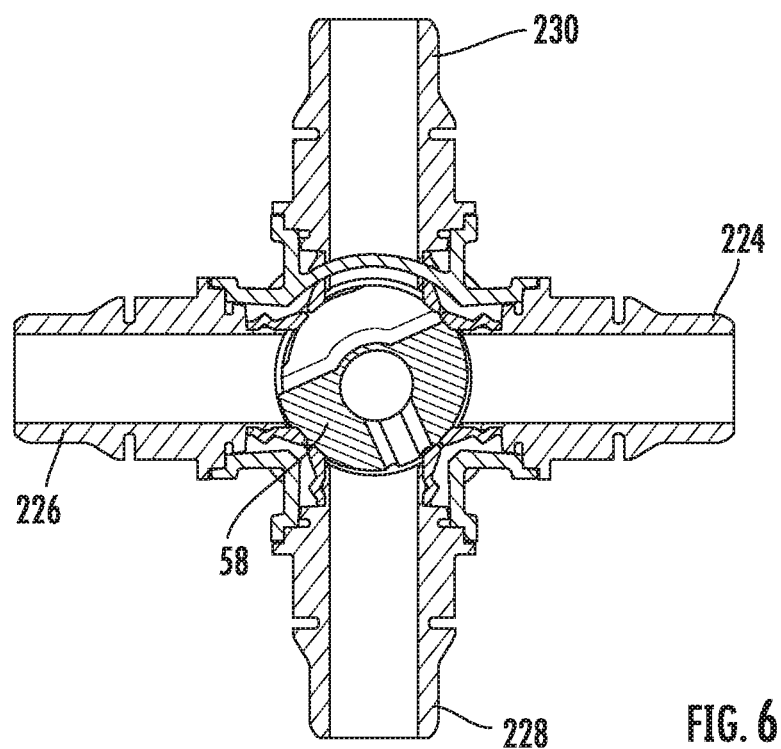
FIG. 6 is a cross-sectional illustration of the embodiment of the multi-port multi-axis valve of FIG. 1 with its shell body positioned at a 156° clockwise location relative to the shell body position shown in FIG. 1.

FIGS. 4-6 illustrate similar rotational alignments as shown in FIGS. 1-3, but starting with an orientation of the shell body 58 that is 180° from that shown in FIG. 1. Such orientations provide fluid communication between ports 46 and 50, and variable mixing (or division) of flow between ports 42, 44, and 48, as well as isolation of ports 42 and 44 as discussed with regard to FIGS. 2 and 3.

With the symmetrical layout of the four ports 42, 44, 46, 48 and the openings 20, 22, similar operation will become apparent to those skilled in the art from the foregoing when the shell body 58 is initially oriented at 90° and 270° from the orientation shown in FIG. 1, and a discussion thereof will be forgone in the interest of brevity.

Figure 8:
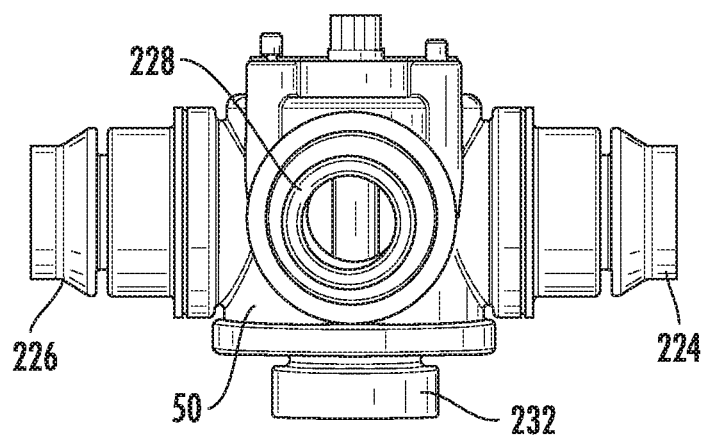
FIG. 8 is a bottom-side perspective view illustration of the embodiment of the multi-port multi-axis valve of FIG. 1.
Figure 9:
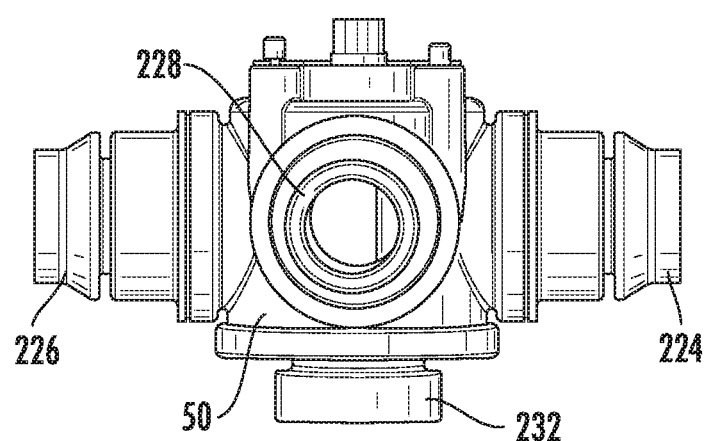
FIG. 9 is a bottom-side perspective view illustration of the embodiment of the multi-port multi-axis valve of FIG. 2.

FIGS. 7, 8 provide isometric side views of the embodiment of the multi-port multi-plane valve 32 shown with the shell body 58 positioned as shown in FIG. 1 when viewed into port body 224 and 228, respectively. FIG. 9 provides isometric side views of the embodiment of the multi-port multi-plane valve 32 shown with the shell body 58 positioned as shown in FIG. 2 when viewed into port body 228.

Figure 10:
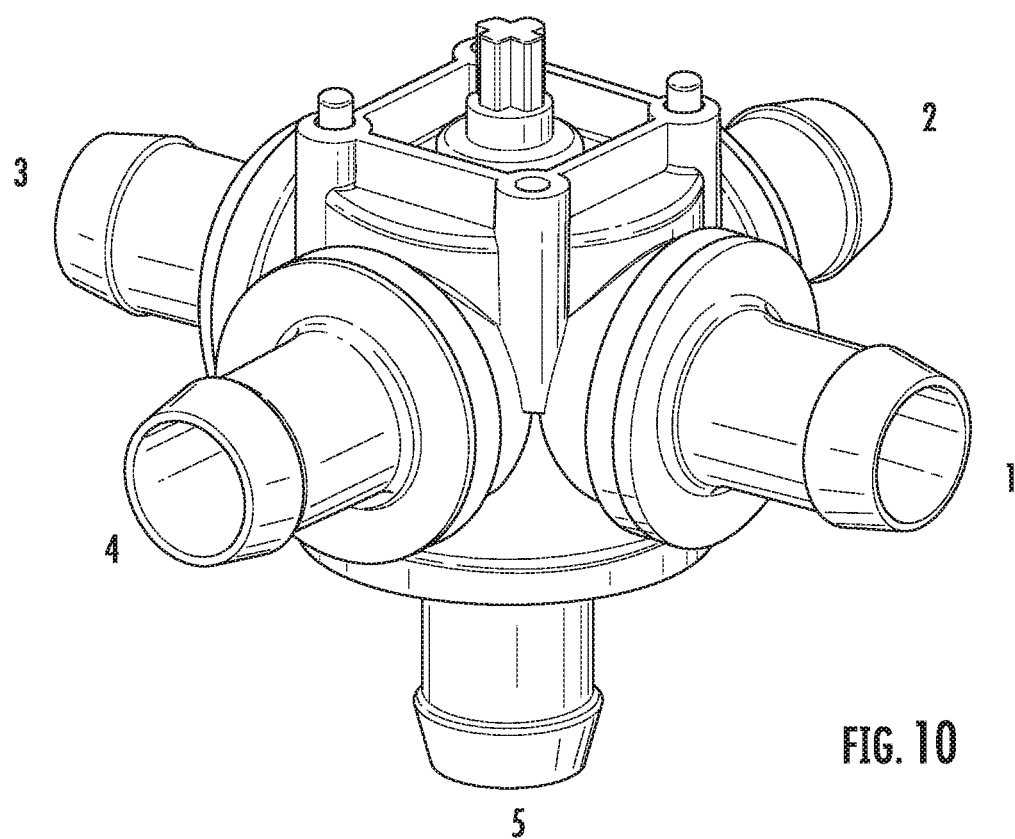
FIG. 10 is an isometric perspective view of an embodiment of the multi-port multi-plane valve of the present invention.
Figure 11:
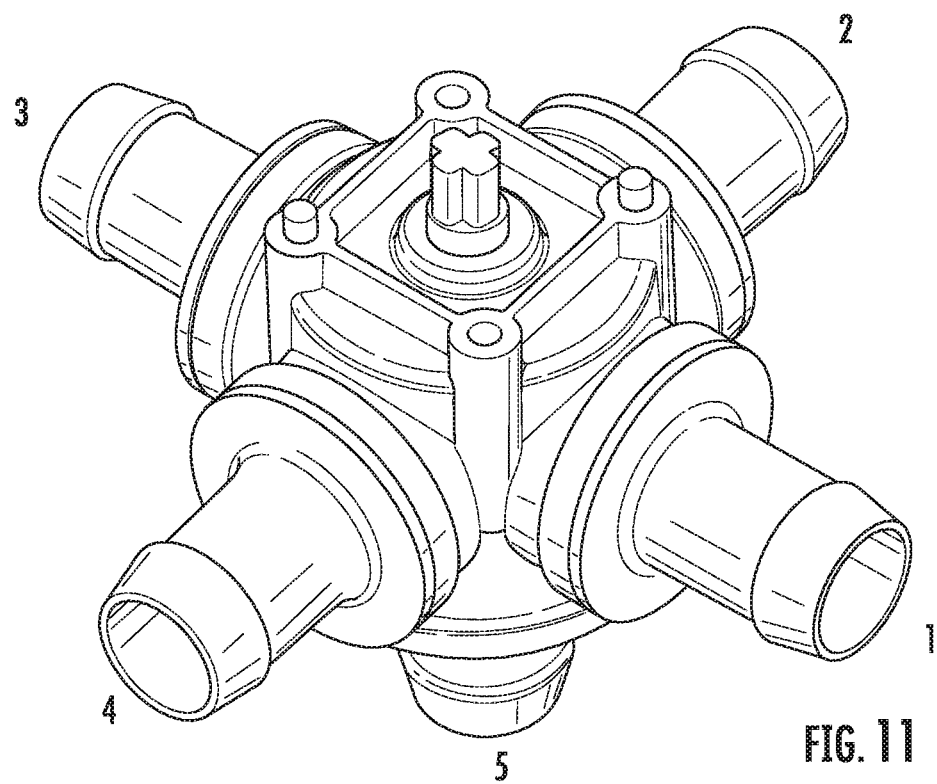
FIG. 11 is an isometric perspective view of an embodiment of the multi-port multi-plane valve of the present invention shown in FIG. 10, rotated to show additional features of this embodiment.
Figure 12:
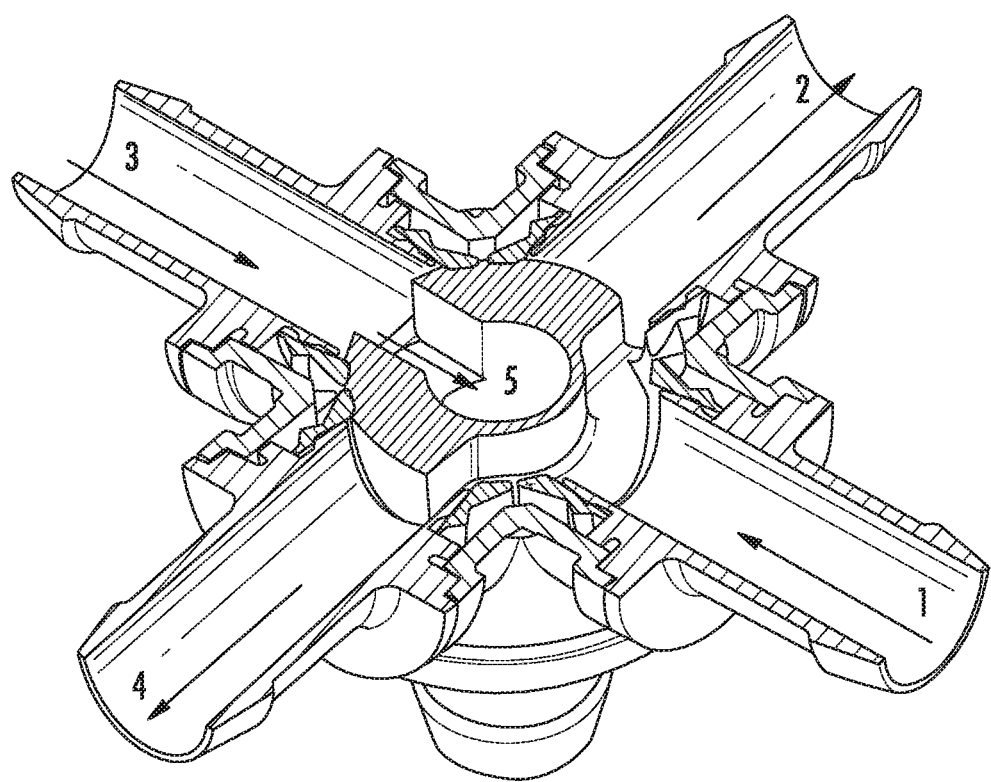
FIG. 12 is an isometric perspective cross-sectional illustration of the embodiment of the multi-port multi-axis valve of FIG. 10 having illustrative flow arrows superimposed thereon.

Turning now to FIGS. 10 and 11, there are illustrated isometric views of an embodiment of a multi-port multi-plane valve similar to that discussed hereinabove. However, the reference numerals have been removed and replaced with five port designations 1-5 to simplify the understanding of the operation thereof for the following description. In order to aid in this description, the isometric cross-sectional view of FIG. 12 is also instructive as it illustrates the internal passages and the shell body with the same five port designations 1-5. Further, FIG. 12 and the figures included thereafter introduce flow arrows and blocked flow symbols to aid in the understanding of the operation of the valve. However, it should be noted that the directional heads of the flow arrows shown in FIGS. 12-20 are not limiting on the flow direction through the valve, but instead only illustrate possible flows through the valve based on the communication enabled by the positioning of the shell body. Indeed, flow in other directions is also possible based on the external plumbing and flow system, and flow in both directions at different times through the same ports based on these external factors is also possible.

Figure 13:
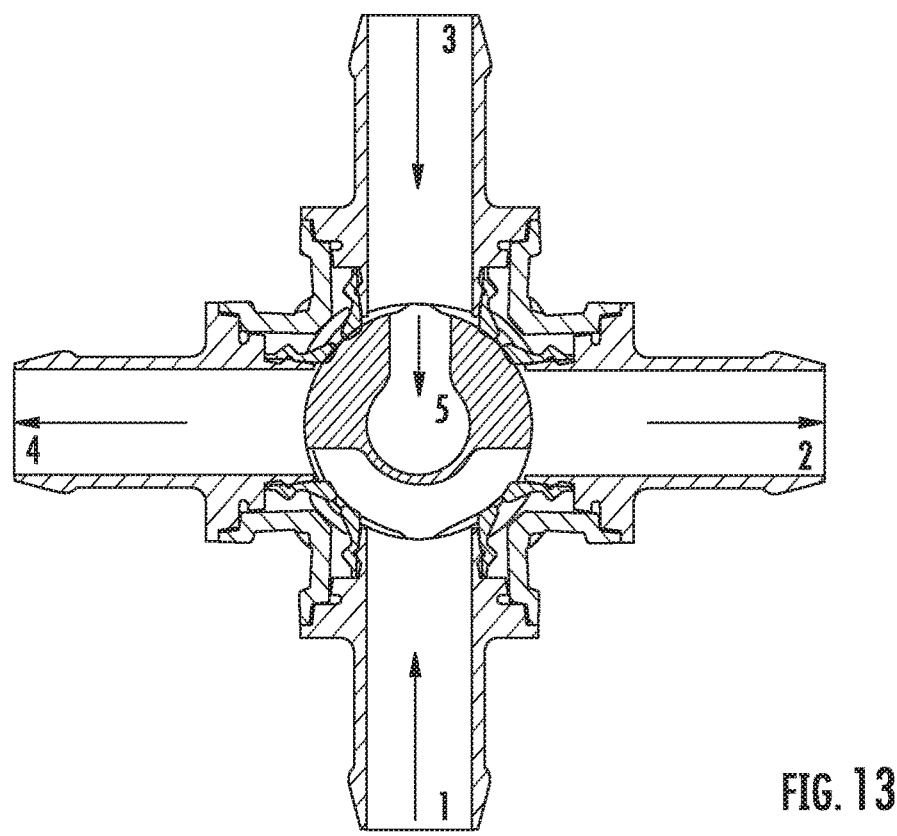
FIG. 13 is top a cross-sectional illustration of the embodiment of the multi-port multi-axis valve of FIG. 10 having illustrative flow arrows superimposed thereon with its shell body positioned at a 0° location.

Turning now to FIG. 13, the shell body is located in a first position referred to herein as 0°. In such position the shell body provides fluid communication between ports 3 and 5, and fluid communication between ports 1, 2, and 4. As the shell body is rotated, the percentage flow can be varied between the ports 2 and 4 to provide a greater or lesser flow from port 1.

Figure 14:
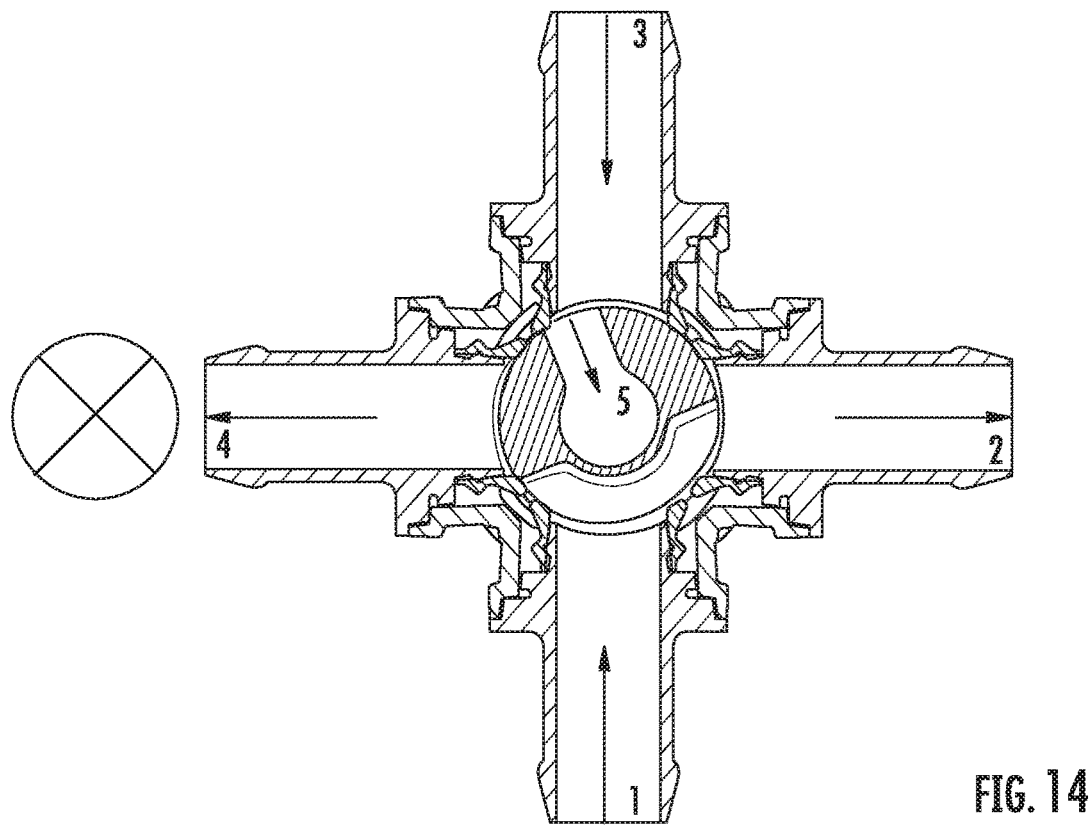
FIG. 14 is a cross-sectional illustration of the embodiment of the multi-port multi-axis valve of FIG. 10 having illustrative flow arrows and an indicator of a closed flow passage superimposed thereon with its shell body positioned at a 24° counter-clockwise location relative to the shell body position shown in FIG. 13.
Figure 15:
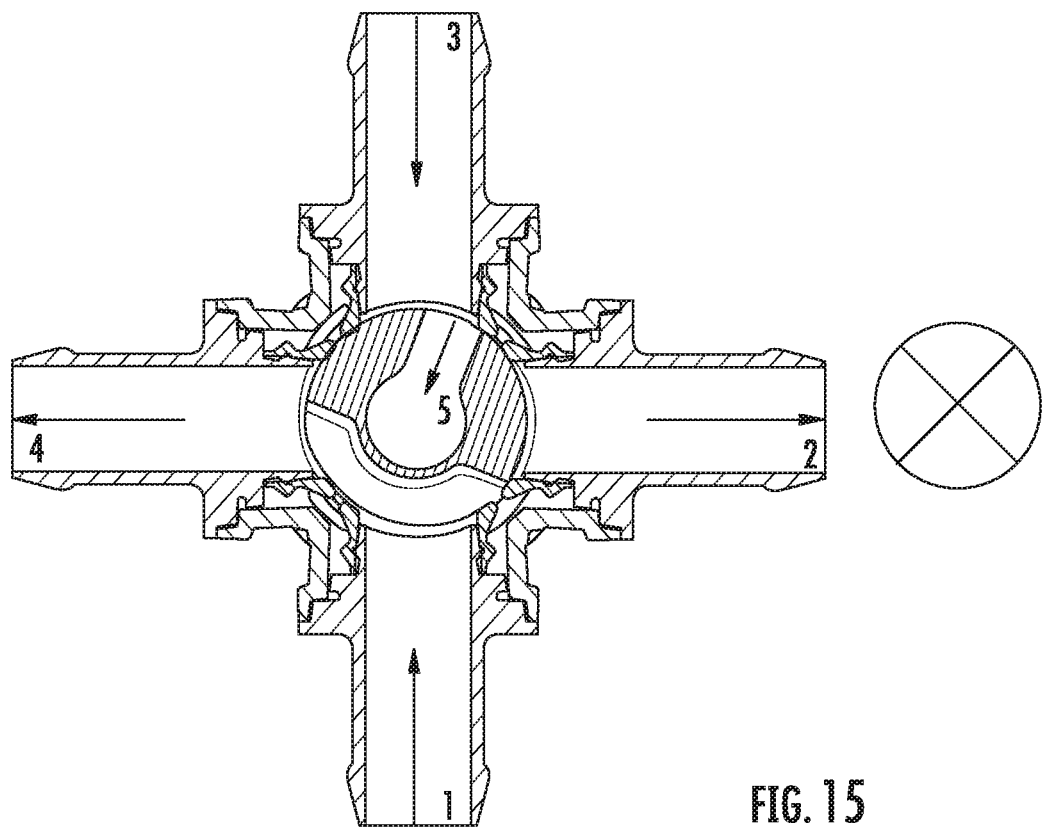
FIG. 15 is a cross-sectional illustration of the embodiment of the multi-port multi-axis valve of FIG. 10 having illustrative flow arrows and an indicator of a closed flow passage superimposed thereon with its shell body positioned at a 24° clockwise location relative to the shell body position shown in FIG. 13.

Once the shell body has rotated about 24° in the illustrated embodiment as shown in FIG. 14, port 4 is isolated as shown by the blocked flow symbol such that it has no fluid communication to any of the other ports. However, fluid communication is still provided between ports 1 and 2 (and between 3 and 5). A rotation of the shell body about 24° from the orientation of FIG. 13 in the other direction as shown in FIG. 15 isolates port 2 as shown by the blocked flow symbol such that it has no fluid communication to any of the other ports. However, fluid communication is still provided between ports 1 and 4 (and between 3 and 5).

Figure 16:
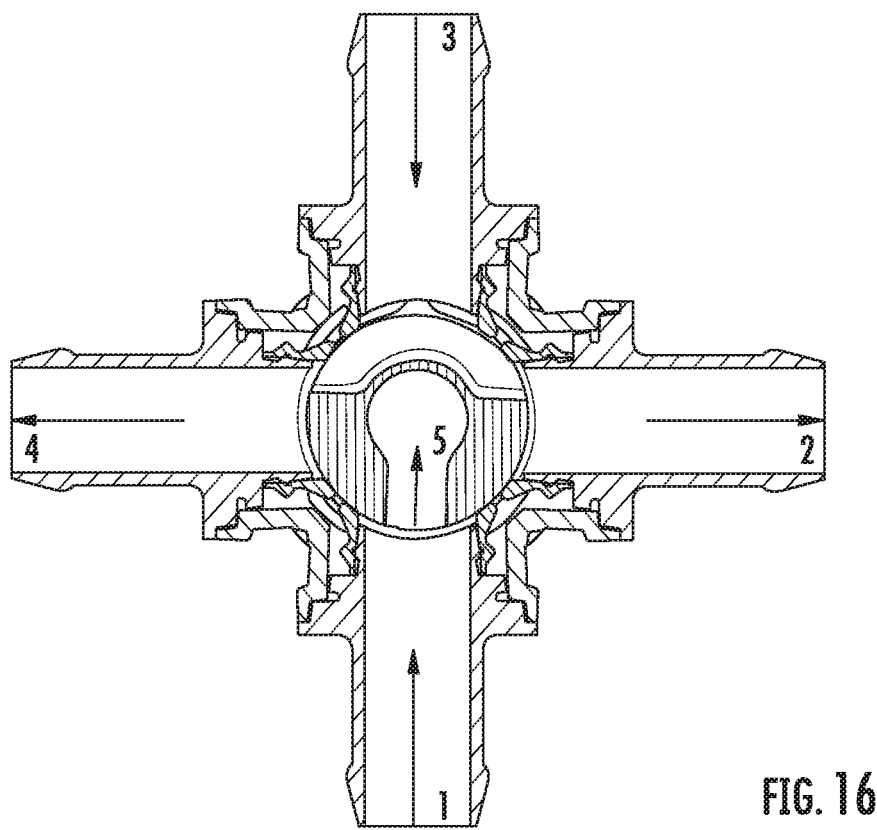
FIG. 16 is a cross-sectional illustration of the embodiment of the multi-port multi-axis valve of FIG. 10 having illustrative flow arrows superimposed thereon with its shell body positioned at a 180° location relative to the shell body position shown in FIG. 13.
Figure 17:
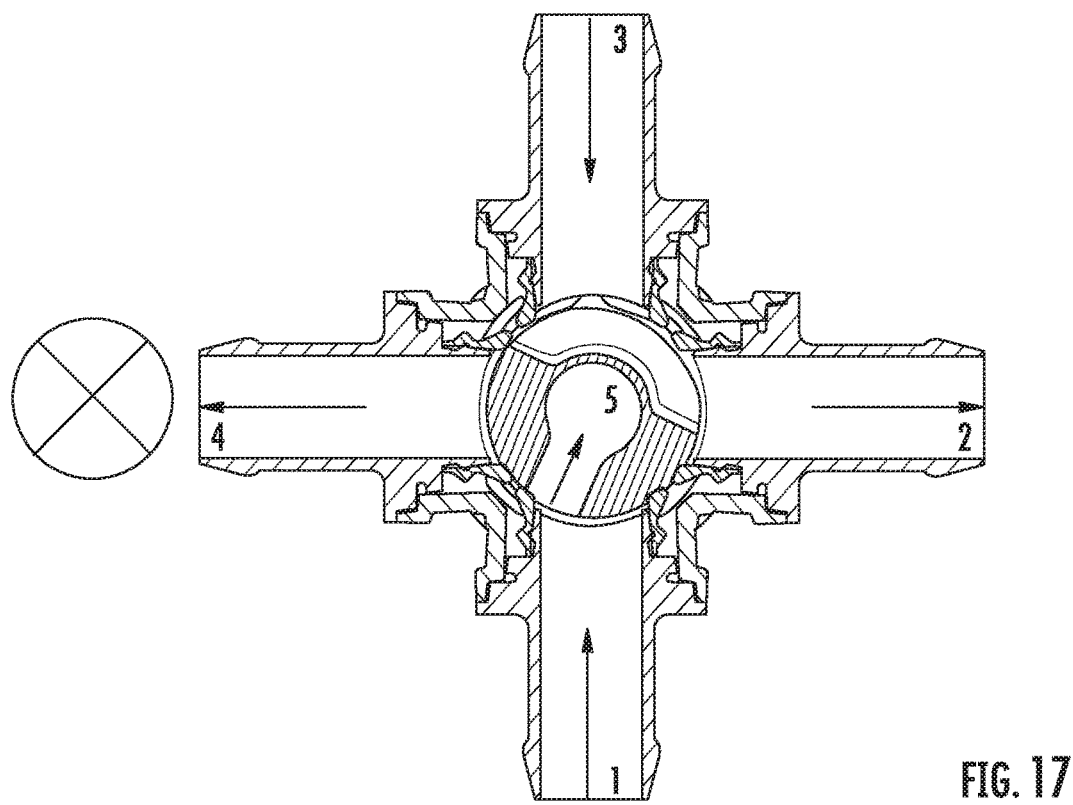
FIG. 17 is a cross-sectional illustration of the embodiment of the multi-port multi-axis valve of FIG. 10 having illustrative flow arrows and an indicator of a closed flow passage superimposed thereon with its shell body positioned at a 156° counter-clockwise location relative to the shell body position shown in FIG. 13.
Figure 18:
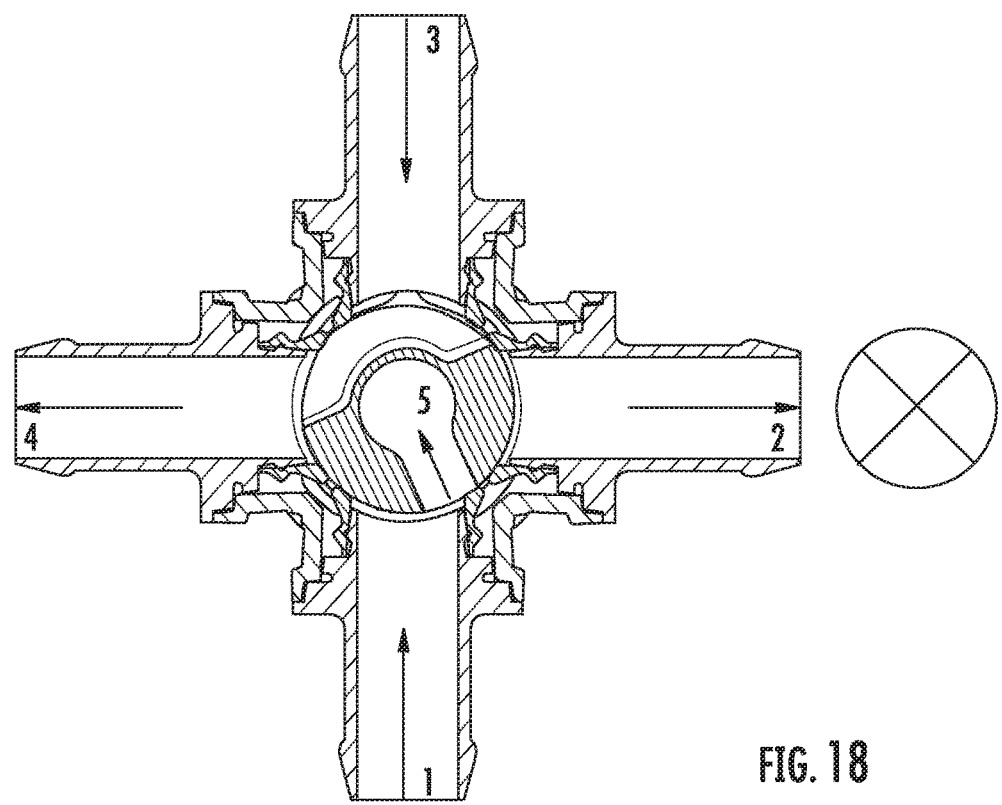
FIG. 18 is a cross-sectional illustration of the embodiment of the multi-port multi-axis valve of FIG. 10 having illustrative flow arrows and an indicator of a closed flow passage superimposed thereon with its shell body positioned at a 156° clockwise location relative to the shell body position shown in FIG. 13.

FIGS. 16-18 illustrate similar rotational alignments as shown in FIGS. 13-15, but starting with an orientation of the shell body that is 180° from that shown in FIG. 13. Such orientations provide fluid communication between ports 1 and 5, and variable flow between ports 3, 2, and 4, as well as isolation of ports 4 and 2 as discussed with regard to FIGS. 14 and 15.

With the symmetrical layout of the four ports 1-4 and the openings in the shell body, similar operation will become apparent to those skilled in the art from the foregoing when the shell body is initially oriented at 90° and 270° from the orientation shown in FIG. 13, and a discussion thereof will be forgone in the interest of brevity.

Figure 19:
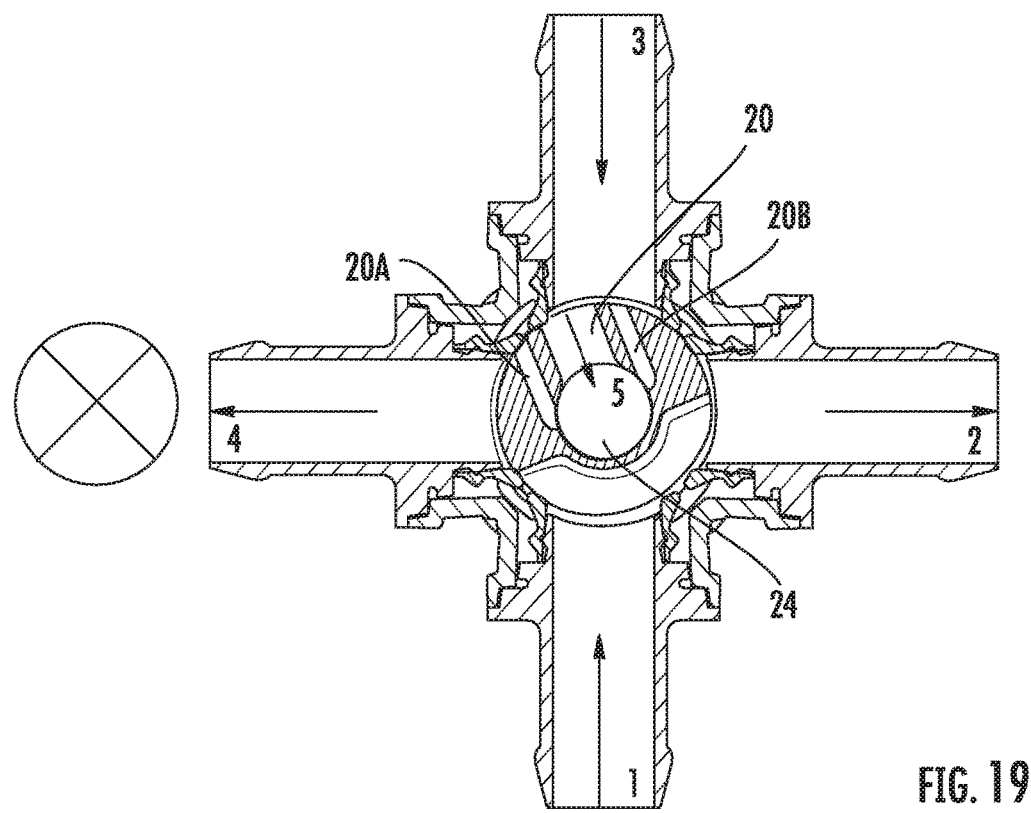
FIG. 19 is a cross-sectional illustration of an embodiment of a multi-port multi-axis valve having illustrative flow arrows and an indicator of a closed flow passage superimposed thereon with an alternative embodiment of a shell body positioned at a 24° counter-clockwise location relative to the shell body position shown in FIG. 13.
Figure 20:
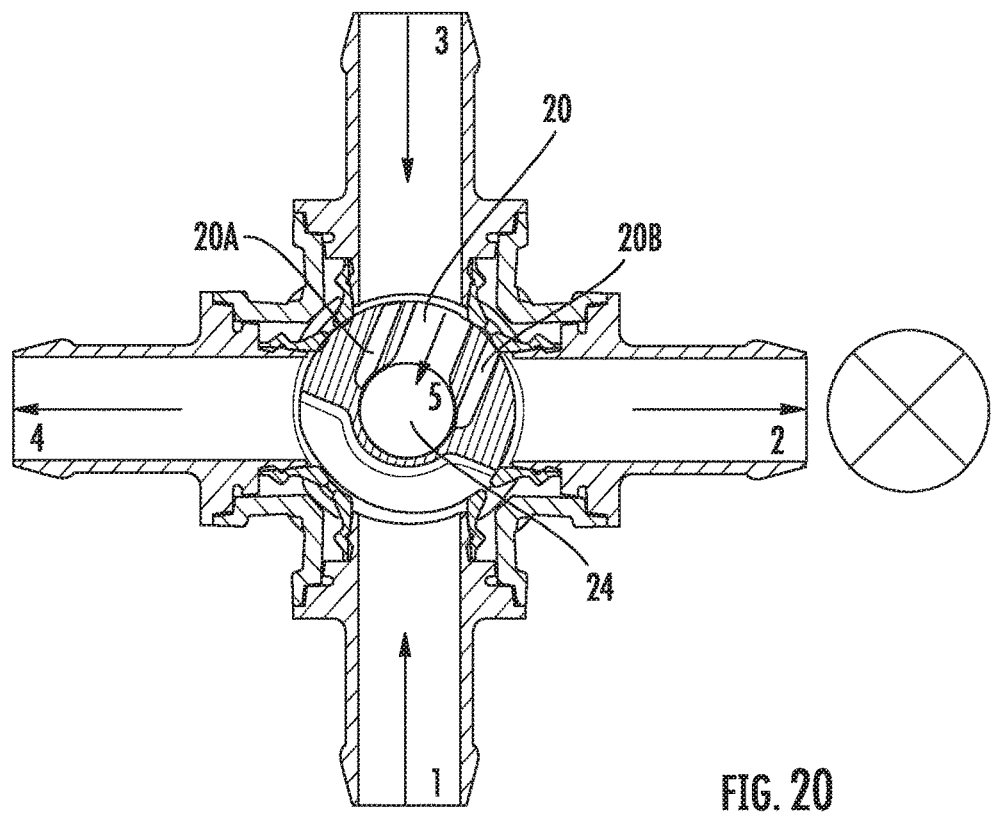
FIG. 20 is a cross-sectional illustration of the embodiment of the multi-port multi-axis valve of FIG. 19 having illustrative flow arrows and an indicator of a closed flow passage superimposed thereon with its shell body positioned at a 24° clockwise location relative to the shell body position shown in FIG. 13.

With reference now to FIGS. 19 and 20, there is illustrated an embodiment of the multi-port, multi-plane valve that includes a shell body having a first and a second flow enhancer channel 20A, 20B provided on either side of the opening 20. These flow enhancer channels 20A, 20B also provide fluid communication to opening 24 leading to port 5, and operate to increase the flow thru the right angle opening when the shell body has been rotated to a position that is blocking the flow though one of the ports (4 in FIGS. 19 and 2 in FIG. 20) on the other side of the valve. Such enhanced flow reduces the pressure drop occurring on one side of the valve when controlling flow paths on the other side of the valve. In embodiments, opening 20 is wider than the first flow enhancer channel 20A and wider than the second flow enhancer channel 20B. Further, in embodiments, the first flow enhancer channel 20A has the same width as the second flow enhancer channel 20B.

As described herein, embodiments of the present invention The multi-port multi-plane valve advantageously overcomes existing problems in the art by presenting an overall construction with a reduced part count, a reduced number of potential leak paths, and a reduction in overall assembly time and cost. In embodiments, the multi-port multi-plane valve has particular suitability for routing coolant in a thermal system, e.g., an engine or motor of a vehicle. For example, the multi-port multi-plane valve can be used to route coolant in a first thermal loop and at least one other thermal loop. In embodiments, a first thermal loop may be to route the coolant to engine/motor components or a battery in need of cooling or warming, and a second thermal loop may be provided to cool or warm the coolant (e.g., to a radiator, chiller, or heater). Depending on the particular needs of the coolant and the components to which it is being routed, the shell body 58 is able to be rotated to direct the flow of coolant through the desired thermal loops.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A multi-port, multi-plane valve, comprising:
a housing defining an internal cavity and comprising a plurality of ports, wherein each of the plurality of ports is in communication with the internal cavity and wherein at least one port of the plurality of ports lies in a first plane normal to a second plane of the other ports of the plurality of ports;
a shell body rotatably disposed within the internal cavity to selectively provide planar fluid communication between a first subset of the plurality of ports and multi-plane fluid communication between a second subset of the plurality of ports; and
wherein the shell body includes an opening and at least one flow enhancer channel arranged in the second plane, the at least one flow enhancer channel configured to reduce a pressure drop occurring in the multi-plane fluid communication when varying the planar fluid communication between the second subset of the plurality of ports.

2. The multi-port, multi-plane valve of claim 1, wherein the at least one flow enhancer channel comprises a first flow enhancer channel arranged on a first side of the opening and a second flow enhancer channel arranged on a second side of the opening.

3. The multi-port, multi-plane valve of claim 2, wherein the opening is wider than the first flow enhancer channel and wider than the second flow enhancer channel.

4. The multi-port, multi-plane valve of claim 3, wherein the first flow enhancer channel has the same width as the second flow enhancer channel.

5. A multi-port, multi-plane valve, comprising:
a housing defining an internal cavity and comprising a plurality of ports, wherein each of the plurality of ports is in communication with the internal cavity and wherein at least one port of the plurality of ports lies in a first plane normal to a second plane of the other ports of the plurality of ports;
a shell body rotatably disposed within the internal cavity to selectively provide planar fluid communication between a first subset of the plurality of ports and multi-plane fluid communication between a second subset of the plurality of ports;
wherein the at least one port of the plurality of ports comprises a first port and wherein the other ports of the plurality of ports comprises a second port, a third port, a fourth port, and a fifth port; and
wherein the shell body is configured to provide multi-plane fluid communication between the first port and at most one of the second port, the third port, the fourth port, or the fifth port at any rotation angle of the shell body.

6. A multi-port, multi-plane valve, comprising:
a housing defining an internal cavity and comprising a plurality of ports, wherein each of the plurality of ports is in communication with the internal cavity and wherein at least one port of the plurality of ports lies in a first plane normal to a second plane of the other ports of the plurality of ports;
a shell body rotatably disposed within the internal cavity to selectively provide planar fluid communication between a first subset of the plurality of ports and multi-plane fluid communication between a second subset of the plurality of ports;
wherein the at least one port of the plurality of ports comprises a first port and wherein the other ports of the plurality of ports comprises a second port, a third port, a fourth port, and a fifth port; and
wherein the shell body is configured to provide planar fluid communication between at least two of the second port, the third port, the fourth port, or the fifth port at any rotation angle of the shell body.

7. A multi-port, multi-plane valve, comprising:
a housing defining an internal cavity and comprising a plurality of ports, wherein each of the plurality of ports is in communication with the internal cavity and wherein at least one port of the plurality of ports lies in a first plane normal to a second plane of the other ports of the plurality of ports;
a shell body rotatably disposed within the internal cavity to selectively provide planar fluid communication between a first subset of the plurality of ports and multi-plane fluid communication between a second subset of the plurality of ports;
wherein the at least one port of the plurality of ports comprises a first port and wherein the other ports of the plurality of ports comprises a second port, a third port, a fourth port, and a fifth port;
wherein the second port, the third port, the fourth port, and the fifth port are arranged at right angles to each other;
wherein, at a reference rotation angle of 0°, the second subset of the plurality of ports comprises the first port in multi-plane fluid communication with the second port and wherein the first subset of the plurality of ports comprises planar fluid communication between the third port, the fourth port, and the fifth port; and wherein at a rotation angle of about 24° relative to the reference rotation angle of 0°, the second subset of the plurality of ports comprises the first port in multi-plane fluid communication with the second port, wherein the third port is fluidly isolated from the fourth port and from the fifth port, and wherein the first subset of the plurality of ports comprises the fourth port in planar fluid communication with the fifth port.

8. A multi-port, multi-plane valve, comprising:
a housing defining an internal cavity and comprising a plurality of ports, wherein each of the plurality of ports is in communication with the internal cavity and wherein at least one port of the plurality of ports lies in a first plane normal to a second plane of the other ports of the plurality of ports;
a shell body rotatably disposed within the internal cavity to selectively provide planar fluid communication between a first subset of the plurality of ports and multi-plane fluid communication between a second subset of the plurality of ports;
a seal member disposed between the shell body and the housing, the seal member configured to prevent unintended cross flow between the plurality of ports; and
wherein the seal member comprises a plurality of seal segments and wherein each of the seal segments is disposed immediately adjacent to another seal segment in a circumferential direction.

9. A method of operating a multi-port, multi-plane valve, the multi-port, multi-plane valve comprising a housing defining an internal cavity, having a first port, a second port, a third port, and a fourth port arranged in a first plane, and having a fifth port arranged in a second plane normal to the first plane and a shell body rotatably disposed within the internal cavity, the method comprising the step of:
rotating the shell body within the internal cavity to provide multi-plane fluid communication between the fifth port and one of the first port, the second port, the third port, or the fourth port, and wherein planar fluid communication is also provide between at least two remaining ports of the first port, the second port, the third port, or the fourth port not in multi-plane fluid communication with the fifth port.

10. The method of claim 9, wherein the step of rotating further comprises rotating the shell body to a reference rotation angle of 0° so that the fifth port is in multi-plane fluid communication with the first port and so that planar fluid communication is provided between the second port, the third port, and the fourth port.

11. The method of claim 10, further comprising the step of directing multi-plane fluid flow from the first port to the fifth port and planar fluid flow from the third port to the second port and to the fourth port.

12. The method of claim 10, further comprising the step of rotating the shell body to a rotation angle of about 24° relative to the reference rotation angle of 0° so that the first port is in multi-plane fluid communication with the first port, so that the second port is fluidly isolated from the third port and from the fourth port, and so that the third port is in planar fluid communication with the fourth port.

13. The method of claim 12, further comprising the step of directing multi-plane fluid flow from the first port to the fifth port and planar fluid flow from the third port to the fourth port.

* * * * *